J. B. GRIFFIN.
PERCOLATOR PUMP.
APPLICATION FILED MAR. 13, 1914.
1,142,322. Patented June 8, 1915.
Fig. 5
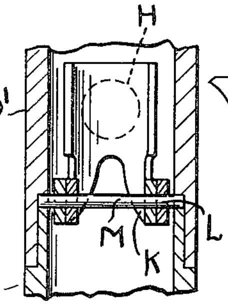
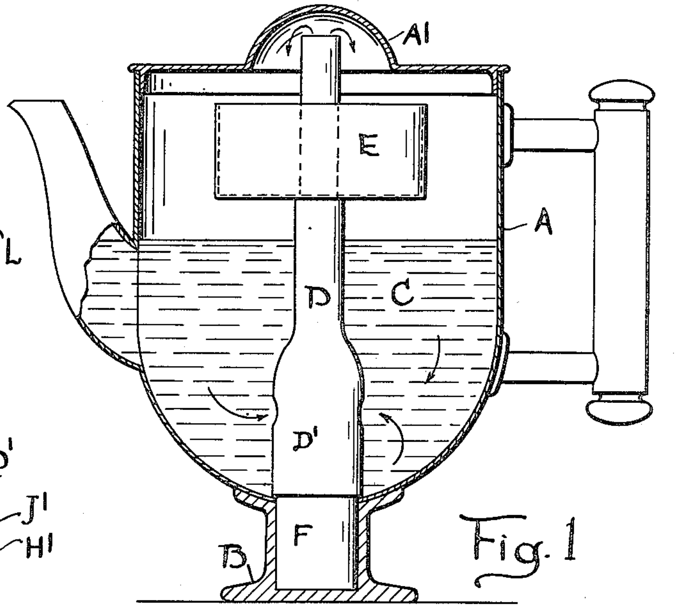
Fig. 1
Fig. 4
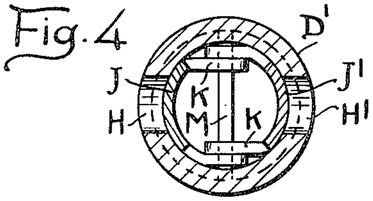
Fig. 2
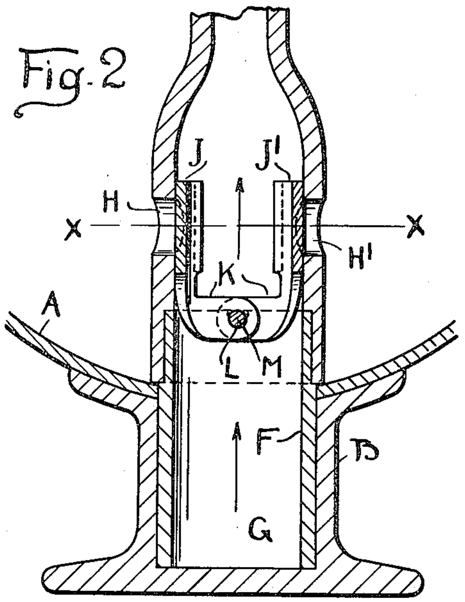
Fig. 3
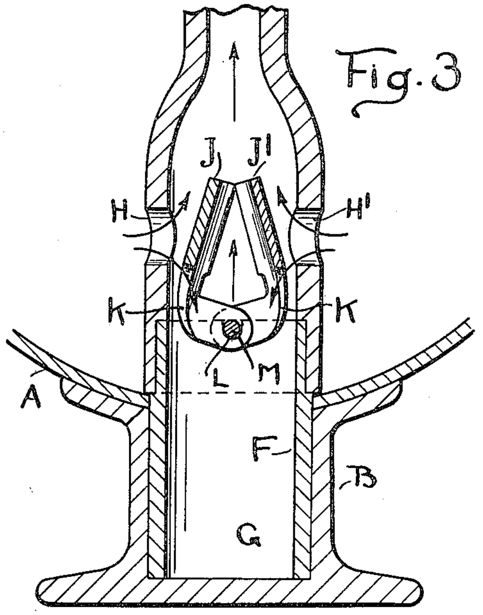
WITNESSES
Robert N. Van Broekide
Virginia C. Spratt.
INVENTOR
John B. Griffin
BY
Ralzemond A. Parker.
ATTORNEY

UNITED STATES PATENT OFFICE.

JOHN B. GRIFFIN, OF DETROIT, MICHIGAN.

PERCOLATOR-PUMP.

1,142,322. Specification of Letters Patent. Patented June 8, 1915.

Application filed March 13, 1914. Serial No. 824,351. REISSUED

*To all whom it may concern:*

Be it known that I, JOHN B. GRIFFIN, a citizen of the United States, residing at Detroit, county of Wayne, State of Michigan, have invented a certain new and useful Improvement in Percolator-Pumps, and declare the following to be a full, clear, and exact description of the same, such as will enable others skilled in the art to which it pertains to make and use the same, reference being had to the accompanying drawings, which form a part of this specification.

My invention relates to percolator pumps for coffee pots, etc., and consists in the structure, arrangements, and combinations hereinafter described and claimed.

In the drawings, Figure 1, is a partial vertical section of a receptacle such as a coffee pot adapted to be heated at the bottom by electrical means or otherwise and containing my invention. Fig. 2, is a vertical section of the lower part of the percolator pump and base of the receptacle containing it showing the valves hereinafter described in the closed position. Fig. 3, is a similar vertical section of the same parts but with the valves in the open position. Fig. 4, is a cross section on the line X—X Fig. 2. Fig. 5, is a vertical section of the valves at right angles to that of Figs. 2 and 3.

In the drawings similar letters refer to similar parts.

In the drawings A is the body of a vessel containing my improvement usually that of a coffee pot.

B, is the base thereof and which in itself is adapted to be heated but as such means of heating especially electrically, are old and in common use, it is entirely unnecessary to either illustrate or describe them. It suffices to say that the heat is supplied to the base B.

C, is shading representing the liquid in said receptacle A.

D, is the percolator pump.

E, is the receptacle to receive the liquid from the upper end thereof. As there is nothing novel and as it constitutes no part of my invention in the particular feature illustrated by E, it is unnecessary to describe it.

My invention resides in the construction shown in Figs. 2, 3, 4 and 5. In this construction $D^1$ is the wall of a lower part of a pump which is suitably erected upon a base piece F. This extends below the bottom of the receptacle A and forms a chamber for liquids at G. Two perforations H and $H^1$ are made upon either side of the walls $D^1$ which perforations are normally closed by valves, which are marked J $J^1$, of a peculiar shape and operation. The form of the valves J, $J^1$ are illustrated in the four Figs. 2, 3, 4 and 5. Each valve consists in a semicircular piece adapted to fit closely in the circular interior of the part $D^1$ so closely as to be practically liquid-tight and when adjacent to and cover the holes H $H^1$, prevent the escape of liquid therethrough. Each valve has two depending legs of a curved shape as shown at K, K and they are loosely journaled at L upon a pin M passing into the wall on each side of the part $D^1$. Their normal position in view of their weight would be that shown in Fig. 2 with the orifices H and $H^1$ closed but they are capable of being forced inwardly in the position shown in Fig. 3, whereby the orifices H and $H^1$ are shown open. It will be observed that the valves J, $J^1$ are held in this position as shown in Fig. 2 by their gravity as they are supported upon the pin M and that they are caused to swing inwardly by a force which must overcome this gravitational tendency to hold the position shown in Fig. 2. When the receptacle is filled with liquid the pressure of the liquid forces the valves J, $J^1$ inwardly and the liquid passes through the orifices H, $H^1$ filling the tube D and also the receptacle G. When this liquid is heated by heat applied to the lower part of the receptacle, the liquid therein expands and is of course pushed upwardly. As the liquid is expelled from the lower end or receptacle, G, more liquid enters by the opening of the valves, and the process is repeated. Liquid thereupon is forced out from the upper end of the tube D against the top $A^1$ of the receptacle A and falls into the receptacle E.

Thus a very efficient percolator pump is produced, one that is easy to take apart and clean, and one that is practically not liable to get out of order.

Having thus described my invention what I desire to claim is:

1. In a percolator pump, the combination of a vertical tube provided with an orifice in its side and valve comprising the part of a tube adapted to fit the inside of said tube and having a depending leg or stem projecting angularly from the tubular part, and means near the center of the tube for pivotably supporting the free end of the leg or stem, the center of gravity in the entire valve being so located that the valve normally rests against the inside of the tube and closes the orifice, substantially as described.

2. In a percolator pump, the combination of a vertical tube provided with oppositely disposed orifices, a pin running crosswise of the tube near its axis, said pin being located below the said orifices, and a pair of part tubular valves, each provided with an angularly extending and depending leg or stem pivotably mounted on said pin, the center of gravity of the valves being so arranged as to normally cause the valves to hold against the inside of the tube and close the orifices.

In testimony whereof, I sign this specification in the presence of two witnesses.

JOHN B. GRIFFIN.

Witnesses:

VIRGINIA C. SPRATT,

AGNES M. HIPKINS.